United States Patent
Hutter et al.

(10) Patent No.: US 11,628,562 B2
(45) Date of Patent: Apr. 18, 2023

(54) METHOD, DEVICE AND COMPUTER PROGRAM FOR PRODUCING A STRATEGY FOR A ROBOT

(71) Applicant: Robert Bosch GmbH, Stuttgart (DE)

(72) Inventors: Frank Hutter, Freiburg (DE); Lior Fuks, Saint-Louis (FR); Marius Lindauer, Lehrte (DE); Noor Awad, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 375 days.

(21) Appl. No.: 16/921,906

(22) Filed: Jul. 6, 2020

(65) Prior Publication Data

US 2021/0008718 A1    Jan. 14, 2021

(30) Foreign Application Priority Data

Jul. 12, 2019    (DE) ............ 10 2019 210 372.3

(51) Int. Cl.
*B25J 9/16* (2006.01)
*G05B 17/02* (2006.01)

(52) U.S. Cl.
CPC ............ *B25J 9/163* (2013.01); *B25J 9/161* (2013.01); *G05B 17/02* (2013.01)

(58) Field of Classification Search
CPC .......... B25J 9/163; B25J 9/161; G05B 17/02; G05B 2219/40499; G05B 13/027; G06N 20/00; G06N 3/086

(Continued)

(56) References Cited

U.S. PATENT DOCUMENTS 11,049,008 B2 * 6/2021 Mnih .................... G06N 3/006
11,222,262 B2 * 1/2022 Perez ................... G06N 3/0445

(Continued)

FOREIGN PATENT DOCUMENTS

WO    WO-2021249616 A1 * 12/2021

OTHER PUBLICATIONS

Florensa, C. et al; "Automatic Goal Generation for Reinforcement Learning Agents", 2018, PMLR, Proceedings of the 35th International Conference on Machine Learning, Stockholm, Sweden, vol. 80, pp. 1515-1528 (Year: 2018).*

(Continued)

*Primary Examiner* — Jaime Figueroa
(74) *Attorney, Agent, or Firm* — Norton Rose Fulbright US LLP; Gerard Messina

(57) ABSTRACT

A method for producing a strategy for a robot. The method includes the following steps: initializing the strategy and an episode length; repeated execution of the loop including the following steps: producing a plurality of further strategies as a function of the strategy; applying the plurality of the further strategies for the length of the episode length; ascertaining respectively a cumulative reward, which is obtained in the application of the respective further strategy; updating the strategy as a function of a second plurality of the further strategies that obtained the greatest cumulative rewards. After each execution of the loop, the episode length is increased. A computer program, a device for carrying out the method, and a machine-readable memory element on which the computer program is stored, are also described.

17 Claims, 4 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 2010/0114807 | A1* | 5/2010 | Ueda | G05B 13/0265 |
| | | | | 706/25 |
| 2015/0100530 | A1* | 4/2015 | Mnih | A63F 13/67 |
| | | | | 706/25 |
| 2017/0228662 | A1* | 8/2017 | Gu | G06N 3/0427 |
| 2018/0165603 | A1* | 6/2018 | Van Seijen | G06N 3/0454 |
| 2019/0244099 | A1* | 8/2019 | Schaul | G06N 3/006 |
| 2020/0143206 | A1* | 5/2020 | Kartal | G06V 10/82 |
| 2020/0320435 | A1* | 10/2020 | Sequeira | G06N 3/006 |
| 2020/0372410 | A1* | 11/2020 | Karaletsos | G06N 3/0454 |
| 2021/0237266 | A1* | 8/2021 | Kalashnikov | B25J 9/1697 |
| 2021/0319362 | A1* | 10/2021 | Mguni | G06N 7/005 |
| 2021/0383273 | A1* | 12/2021 | Claeys | G06F 16/2379 |

OTHER PUBLICATIONS

Plappert, Matthias, et al. "Multi-Goal Reinforcement Learning: Challenging Robotics Environments and Request for Research", arXiv, Mar. 2018, Machine Learning-Artificial Intelligence-Robotics, https://arxiv.org/abs/1802.09464 (Year: 2018).*

Chrabaszcz et al., "Back To Basics: Benchmarking Canonical Evolution Strategies for Playing Atari," Cornell University, 2018, pp. 1-8. https://arxiv.org/pdf/1802.08842.

Resnick, et al.: "Backplay: 'Man muss immer umkehren'", Under Review Conference Paper at ICLR 2019; URL: https.//arxiv.org/pdf/1807.06919, Dec. 31, 2018, pp. 1-18.

Salimans and Chen: "Learning Montezuma's Revenge from a Single Demonstration", URL: https://arxiv.org/abs/1812.0338, Dec. 8, 2018, pp. 1-10.

Stulp and Sigaud: "Robot Skill Learning: From Reinforcement Learning to Evolution Strategies", PALADYN Journal of Behavioral Robotics, 4(1) (2013), pp. 49-61.

* cited by examiner

Algorithm 1: Canonical Evolution Strategy

Input:
$\theta_0$ - Initial policy vector parameters
$T$ - time budget
$E$ - max length for each episode
$\lambda$ - Population size
$\mu$ - Parent population size
$\sigma$ - Mutation step-size
$F(\theta)$ - Fitness function for policy evaluation 1 for $j \in \{1...\mu\}$ do
2 $\quad w_j = \frac{log(\mu+0.5)-log(j)}{\sum_{k=1}^{\mu} log(\mu+0.5)-log(k)}$
3 end
4 while *Budget T remains* do
5 $\quad$ for $i = 0, 1...\lambda$ do
6 $\quad\quad \epsilon_i \sim \mathcal{N}(0, I)$
7 $\quad\quad s_i \leftarrow F_E(\theta_t + \sigma \cdot \epsilon_i)$
8 $\quad$ end
9 $\quad$ Sort $(\epsilon_1, ..., \epsilon_\lambda)$ according to $s$ in ascending order
10 $\quad$ Update policy: $\theta_{t+1} \leftarrow \theta_t + \sigma \cdot \sum_{j=1}^{\mu} w_j \cdot \epsilon_j$
11 end

Output: Return best found policy $\theta_t$

Fig. 2

Algorithm 2: ES-based Progressive Episode Length

Input:
$E$ - Episode Scheduler
$T$ - Time Scheduler
$N$ - Maximal number of iterations 1. Initialize a policy from normal distribution $\theta_0 \sim \mathcal{N}$;
2. for $n \in \{1 \ldots N\}$ do
3.     Set episode length according to $E(n-1)$;
4.     Set time limit according to $T(n-1)$;
    /* Perform ES as in Algorithm 1 */
5.     $\theta_n \leftarrow ES(\theta_{n-1}, T(n-1), E(n-1))$;
6. end

Output: $\theta_N$

Fig. 3

METHOD, DEVICE AND COMPUTER PROGRAM FOR PRODUCING A STRATEGY FOR A ROBOT

CROSS REFERENCE

The present application claims the benefit under 35 U.S.C. § 119 of German Patent Application No. DE 102019210372.3 filed on Jul. 12, 2019, which is expressly incorporated herein by reference in its entirety.

FIELD

The present invention relates to a method for producing a strategy so that a specifiable goal is achieved when a robot, in a particular situation, performs actions on the basis of the strategy. The present invention also relates to a device and to a computer program, which are designed to implement the method.

BACKGROUND INFORMATION

In their paper "Back to Basics: Benchmarking Canonical Evolution Strategies for Playing Atari." arXiv preprint arXiv:1802.08842 (2018), Chrabaszcz et al. describe an evolution strategy (ES) as an alternative to reinforcement learning.

SUMMARY

It was observed that some strategies enable agents, in particular robots, to solve complex tasks, but fail in the case of simple subtasks. So that robots are reliably controlled without exception, a method is to be presented below, which makes it possible to produce, in a simple manner, a strategy, which may be used for reliably controlling robots. Furthermore, the strategy may be extended for complex tasks in a simple manner.

In a first aspect of the present invention, an, in particular computer-implemented, method for producing a strategy (i.e., policy) is provided so that if an agent, in particular a robot, performs actions on the basis of the strategy in a particular situation, a specifiable goal is achieved or a task is performed. The method begins with an initialization of the strategy $\theta_0$ and an episode length E). This is followed by a repeated execution of a loop, expediently a (computer) program loop, including the steps explained below. A loop is a control structure in a programming language, which repeats an instruction block for as long as a loop condition remains valid or until an abort condition is fulfilled.

The loop begins with a production of a plurality of further strategies as a function of the strategy $\theta_0$. The further strategies may be produced by applying a randomly chosen variable to the strategy. This is followed by an application of the plurality of the further strategies for the respective at least one episode having the episode length E. If the strategy or the environment of the agent has probabilistic properties, then the further strategies may be applied for multiple episodes. This is followed by an ascertainment of respectively one cumulative reward $F_E$, which is obtained when applying the respective further strategy, and by an update of the strategy $\theta_0$ as a function of a second plurality of the further strategies that attained the greatest cumulative rewards. The second plurality is a specifiable number, the specifiable number being smaller than the number of all further strategies. After each execution of all steps of the loop, the episode length E is increased.

An application of the strategy may be understood as this strategy being used by an agent, in particular the robot, which performs actions as a function of the strategy, e.g., in order to explore its environment, or to achieve its goal. When applying the strategy, an action of the agent is ascertained on the basis of the strategy as a function of a current state of the environment of the agent.

The performance of the action by the agent results in a modification of the environment. This modification may be tied to a reward. Alternatively or additionally, the reward may be a function of the action. The cumulative reward is then the sum of the rewards of all actions within an episode. The episode is a sequence of actions and the episode length is a number of the actions in this episode.

An advantage is that first solving brief and simple tasks is learned, from which first knowledge is determined for the strategy. This knowledge is then used to solve more demanding tasks with increasing episode length. A transfer of the knowledge about solving simple tasks for more complex tasks is thereby achieved. Another advantage of focusing on simpler and shorter tasks at the beginning of the method is that a more stable and quicker optimization of the strategy is achieved. Furthermore, due to the shortened episodes at the beginning, only a segment of the environment is explored. This allows for learning a simple strategy, which may also be applied with promising results to the entire environment. This eventually results in a better generalization of the strategy. Furthermore, the shortened episodes make it possible to evaluate multiple strategies within a specifiable time budget, which allows for quicker learning.

The present invention provides for the episode length E to be initially set to a value smaller than the expected number of actions for reaching the specifiable goal. The episode length E may furthermore be set to a value such that a reward may be received or a partial goal may be reached on the first occasion. It is also possible that the number of actions is set as a function of the maximally obtainable reward, and in particular as a function of the individual obtainable rewards through the actions. The expected number of actions is preferably divided by a specifiable constant, whereby a more aggressive exploration may be set.

It is further provided that the expected number of actions is ascertained by a Monte Carlo simulation. A Monte Carlo simulation is to be understood in that the agent is respectively controlled by several randomly initialized strategies. The episode length may then be selected as a function of reaching the goal and/or as a function of the progress of the agent and/or as a function of the cumulative reward then obtained.

It is furthermore provided that additionally a time budget T is initialized. The loop iterations are calculated only for as long as time remains in time budget T. Time budget T may be either constant across all loop passes or may be increased, in particular doubled, after each loop pass. The time budget is the time that is available for applying the further strategies and for updating the initialized strategy. The time budget is thus a possible abort condition of the loop. The time budget is a physical time, which may be measured, e.g., by a stop watch. Additionally or alternatively, the time budget may be specified by a timer, which is preferably integrated in a processing unit on which the method is carried out.

It is furthermore provided that the current state of the robot and/or a current state of the environment of the robot are detected by a sensor and that the produced strategy is used to ascertain a control variable for the robot as a function of the sensor value.

It should be noted that the strategy may be produced and used not only for controlling the robot, but also for controlling an at least partially autonomous machine, an at least partially autonomous vehicle, a tool, a machine tool or a flying object such as a drone.

A further aspect of the present invention provides for a use of a trained neural network in order to provide a control signal for controlling for the robot as a function of an ascertained output signal, the produced strategy according to the first aspect being implemented by the neural network. The output signal corresponds to the action ascertained by the produced strategy. The produced strategy preferably characterizes the parameterization of the neural network.

In another aspect of the present invention, a computer program is provided. The computer program is designed to carry out one of the above-mentioned methods. The computer program comprises instructions that prompt a computer to carry out one of these indicated methods including all its steps when the computer program is running on the computer. Furthermore, a machine-readable memory module is provided, on which the computer program is stored. Furthermore, a device is provided that is designed to carry out one of the methods.

Exemplary embodiments of the above-mentioned aspects are illustrated in the figures and are explained in greater detail below.

BRIEF DESCRIPTION OF THE DRAWINGS

FIG. 2 shows a schematic representation of a first pseudocode.

FIG. 3 shows a schematic representation of a second pseudocode.

DETAILED DESCRIPTION OF EXAMPLE EMBODIMENTS

Figure 1:
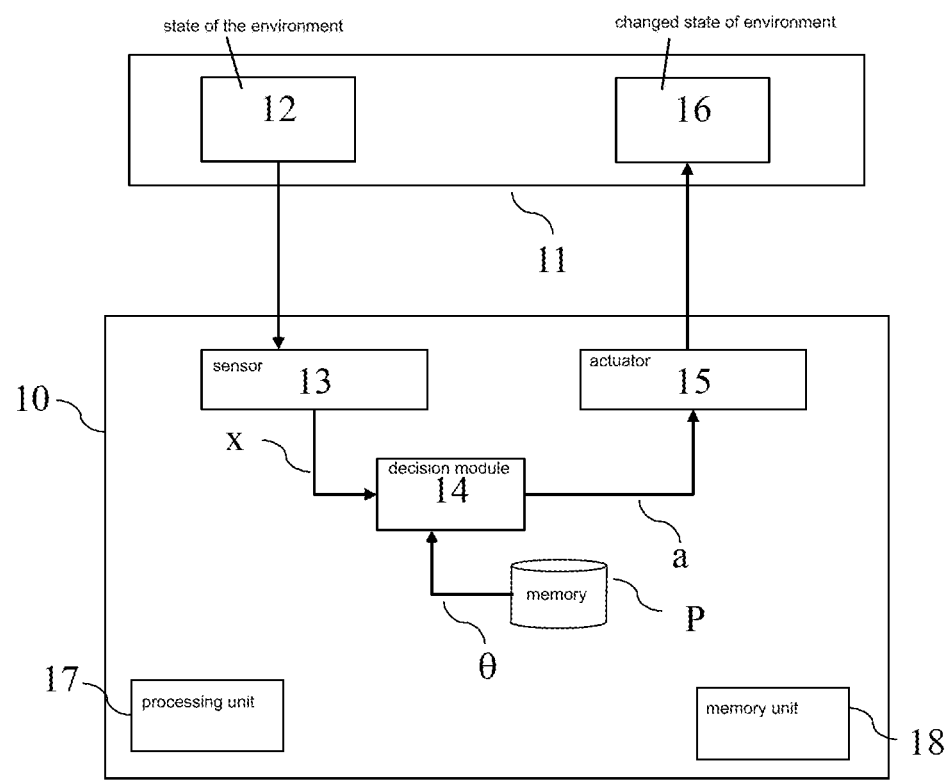
FIG. 1 shows a schematic representation of a robot.

FIG. 1 shows a schematic representation of a robot (10). The robot (10) is designed to learn autonomously a strategy (i.e., policy) by exploring, expediently by interacting with, its environment (11). Depending on the strategy and a detected sensor variable (x), a decision module (14), comprising the strategy, ascertains an optimal action (a). In one exemplary embodiment, the strategy is stored in a memory P in the form of parameters (θ) of a neural network. The decision module (14) comprises this neural network, which ascertains the action (a) as a function of the detected sensor variable (x). The architecture of this neural network may be for example the architecture that is described in the related art document cited at the outset. The sensor variable (x) is detected by a sensor (13). For this purpose, the latter detects a state (12) of the environment (11) of the robot (10). An actuator (15) of the robot (10) may be controlled on the basis of the action (a). As a result of actuator (15) performing the action (a), the state (16) of the environment (11) changes. The performance of the action (a) may serve to explore the environment (11) or to solve the specifiable task or to reach a specifiable goal.

The robot (10) further comprises a processing unit (17) and a machine-readable memory element (18). A computer program may be stored on memory element (18), comprising commands which, when executed on the processing unit (17) prompt the processing unit (17) to operate the robot (10).

It should be noted that the robot (10) may also be an at least partially autonomous vehicle, a drone or a production/machine tool.

FIG. 2 shows in exemplary fashion a pseudocode of a method "canonical evolution strategy (ES)" for producing the strategy for the robot (10).

At the beginning of the pseudocode, it is necessary to specify an initial strategy $\theta_0$, a time budget T, a maximum episode length E, a population variable $\lambda$, a parent population variable $\mu$ and a mutation step variable $\sigma$ and a cumulative reward function $F(\cdot)$. The initial strategy $\theta_0$ is preferably a variable, which are the parameters of the neural network. The initial strategy may be initialized randomly.

At the beginning of the pseudocode, in lines 1 and 2, a first loop is executed via the parent population variable $\mu$ in order to ascertain the constants $w_j$.

Subsequently, the strategy is optimized by a second loop in lines 4 through 11.

The second loop is executed until time budget T is depleted. In the second loop, the initialized strategy $\theta_0$ is mutated by applying, e.g., a random noise. Thereupon, in line 7, the performance of the mutated strategies is evaluated using the cumulative reward function F. The cumulative reward function F may be a cumulative reward over an episode having an episode length E.

In line 9, the strategies are then arranged in descending order according to their obtained cumulative reward $s_i$. In the subsequent line 10, the strategy is updated as a function of the top $\mu$ strategies that are respectively weighted with the constant $w_j$.

The updated strategy may thereupon be output or used as the final strategy in order to execute the second loop anew. The renewed execution of the second loop may be repeated as often as necessary until a specifiable abort criterion is fulfilled. The specifiable abort criterion may be for example that a change of the strategy is smaller than a specifiable threshold value.

FIG. 3 shows by way of example a pseudocode of a method to adapt time budget T and episode length E dynamically during the implementation of the ES.

For this purpose, an episode scheduler, a time scheduler and a number of iterations N are initially provided.

In line 1 of the second pseudoalgorithm, the strategy $\theta_0$ is initialized by sampling from a normal distribution. Subsequently, a loop is executed beginning at line 2 through line 6 over the number of iterations N. First, the maximum episode length E is ascertained by the episode scheduler and optionally the maximum time budget T is ascertained by the time scheduler as a function of the current iteration n. Subsequently, the method ES is carried out using these two ascertained variables E and/or T.

Following each executed loop pass, the episode scheduler may double the episode length E: $E(n)=2^n E(0)$. The initial episode length E(0) may be a value smaller than an expected number of steps required for reaching the goal. Alternatively, the initial episode length E(0) may be divided by a specifiable value, for example 2. Alternatively, the initial episode length E(0) may be ascertained by a Monte Carlo simulation.

The time scheduler may increase the time budget T incrementally with the increasing number of executed loop passes, for example: $T(n)=2^n \kappa$. The value $\kappa$ may correspond to 20 minutes for example. Alternatively, the time scheduler may keep the time budget T constant for every loop pass, it being possible for T to equal 1 hour, for example.

The advantage of the episode scheduler and/or of the time scheduler is that first a strategy is learned in short episodes, which is subsequently used to solve more complex tasks more effectively in longer episodes. For the knowledge of the strategy that was learned in the short episodes may be used again for solving the longer episodes. The advantage of the time scheduler is that an available total time budget may be efficiently divided into partial times for the individual episode lengths.

Figure 4:
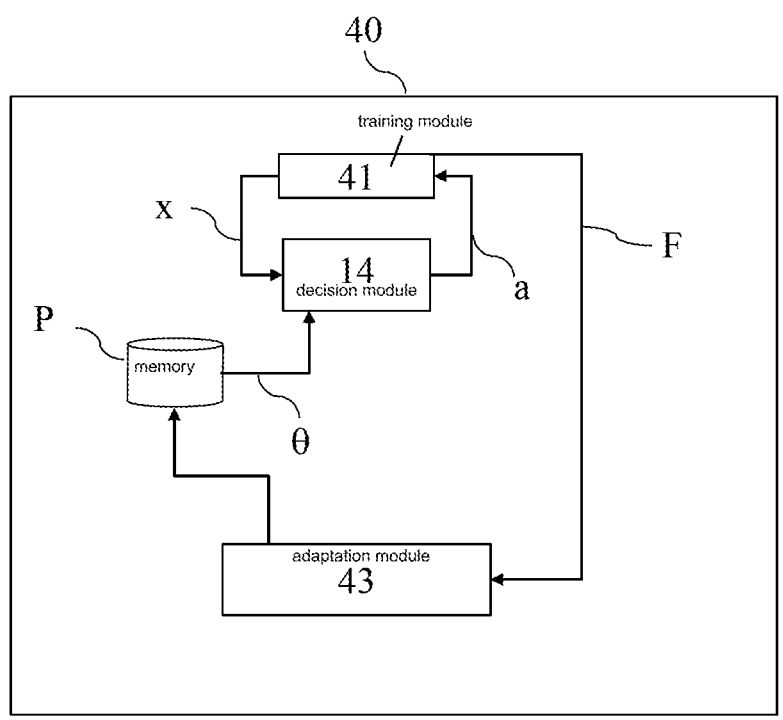
FIG. 4 shows a schematic representation of a device for executing the pseudocode.

FIG. 4 shows a schematic representation of a device (40) for training the decision module (14), in particular for executing the pseudocode in accordance with FIG. 2 or 3. Device (40) comprises a training module (41), which simulates e.g. the environment (11) and outputs the cumulative reward F. The adaptation module (43) then updates the strategy and stores the updated strategy in memory P.

What is claimed is:

1. A method of training a neural network, comprising:
producing parameters of the neural network representing a strategy to control a robot so that a specifiable goal is reached when the robot performs actions based on the strategy, depending on a respective situation, the producing including:
  initializing the strategy and an episode length;
  repeatedly executing a loop including the steps:
    producing a plurality of further strategies as a function of the strategy;
    applying the plurality of the further strategies for a respective at least one episode having the episode length;
    ascertaining, for each of the further strategies, a respective cumulative reward which is obtained when applying the respective further strategy;
    updating the strategy as a function of a specifiable number of the further strategies that obtained the greatest respective cumulative rewards;
  wherein the episode length is increased following each execution of the loop; and
storing the parameters representing the strategy in a memory connected to the neural network.

2. The method as recited in claim 1, wherein a time budget is initialized, the loop being executed only for as long as time remains in the time budget.

3. The method as recited in claim 2, wherein the time budget is increased following every execution of the loop.

4. The method as recited in claim 1, wherein the episode length is initially set to a value smaller than an expected number of actions for reaching the specifiable goal.

5. The method as recited in claim 4, wherein the expected number of actions is ascertained by a Monte Carlo simulation.

6. The method as recited in claim 1, wherein the further strategies are sorted in descending order according to the respective cumulative reward and are respectively weighted using a second specifiable value assigned to a respective position in the order.

7. The method as recited in claim 1, wherein a current state of the robot, and/or a current state of an environment of the robot is detected using a sensor, a control variable being provided for an actuator of the robot, as a function of the sensor value using the updated strategy.

8. A method, comprising:
producing parameters of a neural network representing a strategy for controlling a robot so that a specifiable goal is reached when the robot performs actions based on the strategy, depending on a respective situation, the parameters of the neural network being produced by:
  initializing the strategy and an episode length;
  repeatedly executing a loop including the steps:
    producing a plurality of further strategies as a function of the strategy;
    applying the plurality of the further strategies for a respective at least one episode having the episode length;
    ascertaining, for each of the further strategies, a respective cumulative reward which is obtained when applying the respective further strategy;
    updating the strategy as a function of a specifiable number of the further strategies that obtained the greatest respective cumulative rewards;
  wherein the episode length is increased following each execution of the loop;
storing the parameters representing the strategy in a memory connected to the neural network; and
operating the robot using the neural network to activate an actuator of the robot to provide an action corresponding to the produced strategy as a function of a current state of the robot and/or a current state of an environment of the robot sensed by a sensor and provided to the neural network, the produced strategy being implemented by the neural network in that the neural network provides the action corresponding to the produced strategy from a state provided to the neural network.

9. A non-transitory machine-readable memory element on which is stored a computer program, which when executed by a computer causes the computer to perform a method of training a neural network, the method comprising:
producing parameters of the neural network representing a strategy to control a robot so that a specifiable goal is reached when the robot performs actions based on the strategy, depending on a respective situation, the producing including:
  initializing the strategy and an episode length;
  repeatedly executing a loop including the steps:
    producing a plurality of further strategies as a function of the strategy;
    applying the plurality of the further strategies for a respective at least one episode having the episode length;
    ascertaining, for each of the further strategies, a respective cumulative reward which is obtained when applying the respective further strategy;
    updating the strategy as a function of a specifiable number of the further strategies that obtained the greatest respective cumulative rewards;
  wherein the episode length is increased following each execution of the loop; and
storing the parameters representing the strategy in a memory connected to the neural network.

10. A device, the device comprising:
a processing unit configured to execute computer program instructions to control a method of training a neural network, the method including:
  producing parameters of the neural network representing a strategy to control a robot so that a specifiable goal is reached when the robot performs actions based on the strategy, depending on a respective situation, the producing including:
    initialize the strategy and an episode length;
    repeatedly execute a loop including:
      producing a plurality of further strategies as a function of the strategy;
      applying the plurality of the further strategies for a respective at least one episode having the episode length;

ascertaining, for each of the further strategies, a respective cumulative reward which is obtained when applying the respective further strategy; and updating the strategy as a function of a specifiable number of the further strategies that obtained the greatest respective cumulative rewards;

wherein the episode length is increased following each execution of the loop; and storing the parameters representing the strategy in a memory connected to the neural network.

11. The method as recited in claim 8, wherein a time budget is initialized, the loop being executed only for as long as time remains in the time budget.

12. The method as recited in claim 11, wherein the time budget is increased following every execution of the loop.

13. The method as recited in claim 8, wherein the episode length is initially set to a value smaller than an expected number of actions for reaching the specifiable goal.

14. The method as recited in claim 13, wherein the expected number of actions is ascertained by a Monte Carlo simulation.

15. The method as recited in claim 8, wherein the further strategies are sorted in descending order according to the respective cumulative reward and are respectively weighted using a second specifiable value assigned to a respective position in the order.

16. The method as recited in claim 8, wherein the robot includes at least one of: an at least partially autonomous vehicle, a drone, a production tool, or a machine tool.

17. The method as recited in claim 1, wherein the robot includes at least one of: an at least partially autonomous vehicle, a drone, a production tool, or a machine tool.

* * * * *